US009163830B2

(12) United States Patent
Chiu et al.

(10) Patent No.: US 9,163,830 B2
(45) Date of Patent: Oct. 20, 2015

(54) SEALPOT AND METHOD FOR CONTROLLING A SOLIDS FLOW RATE THERETHROUGH

(75) Inventors: John H. Chiu, West Hartford, CT (US); Bard C. Teigen, Enfield, CT (US)

(73) Assignee: ALSTOM Technology Ltd, Baden (CH)

( * ) Notice: Subject to any disclaimer, the term of this patent is extended or adjusted under 35 U.S.C. 154(b) by 536 days.

(21) Appl. No.: 12/749,284

(22) Filed: Mar. 29, 2010

(65) Prior Publication Data

US 2010/0242815 A1    Sep. 30, 2010

Related U.S. Application Data

(60) Provisional application No. 61/165,072, filed on Mar. 31, 2009.

(51) Int. Cl.
| F23C 10/10 | (2006.01) |
| F22B 31/00 | (2006.01) |
| B01J 8/00  | (2006.01) |
| F23C 10/32 | (2006.01) |

(52) U.S. Cl.
CPC .............. *F23C 10/10* (2013.01); *B01J 8/0025* (2013.01); *F22B 31/0084* (2013.01); *F23C 10/32* (2013.01); *B01J 2208/00752* (2013.01); *B01J 2208/00769* (2013.01)

(58) Field of Classification Search
None
See application file for complete search history.

(56) References Cited

U.S. PATENT DOCUMENTS

| 4,776,288 A | 10/1988 | Beisswenger et al. | |
| 4,915,061 A * | 4/1990 | Garcia-Mallol | 122/4 D |
| 5,341,766 A * | 8/1994 | Hyppanen | 122/4 D |
| 5,343,830 A * | 9/1994 | Alexander et al. | 122/4 D |
| 5,345,883 A | 9/1994 | Panos | |
| 5,363,812 A * | 11/1994 | Belin et al. | 122/4 D |
| 5,365,889 A * | 11/1994 | Tang | 122/4 D |
| 5,370,084 A | 12/1994 | Skowyra et al. | |
| 5,442,919 A | 8/1995 | Wilhelm | |
| 5,476,639 A * | 12/1995 | Hyppanen | 422/147 |
| 5,544,479 A * | 8/1996 | Yan et al. | 60/39.183 |
| 5,840,258 A | 11/1998 | Hyppanen | |

(Continued)

FOREIGN PATENT DOCUMENTS

| CN | 1088478 | 6/1994 |
| CN | 1120144 | 4/1996 |

(Continued)

OTHER PUBLICATIONS

First Office Action of the Chinese Patent Office issued Nov. 27, 2013 for Chinese application 201080015674.9.

(Continued)

*Primary Examiner* — Melvin C Mayes
*Assistant Examiner* — Sheng H Davis
(74) *Attorney, Agent, or Firm* — Robert D. Crawford

(57) ABSTRACT

A sealpot for a combustion power plant includes a downcomer standpipe which receives solids of the combustion power plant, a bed including a first end and a second opposite end, the first end connected to the downcomer standpipe, a discharge standpipe disposed at the second opposite end of the bed, and an orifice plate disposed between the bed and the discharge standpipe separating the discharge standpipe from the bed. The orifice plate includes apertures disposed at a height above the bed which allow transport of fluidized solids and gas through the orifice plate.

27 Claims, 4 Drawing Sheets

(56) References Cited

U.S. PATENT DOCUMENTS

| | | | |
|---|---|---|---|
| 5,850,740 A * | 12/1998 | Sato et al. ................. 60/676 |
| 6,095,095 A * | 8/2000 | Alexander et al. ............ 122/34 |
| 6,923,128 B2 | 8/2005 | Seeber | |
| 2005/0112037 A1 * | 5/2005 | Darling .................. 422/139 |

FOREIGN PATENT DOCUMENTS

| | | |
|---|---|---|
| EP | 1 612 479 | 1/2006 |
| JP | 2000-18543 A | 3/1996 |
| JP | H08-75370 A | 1/2000 |
| WO | 9915829 | 4/1999 |
| WO | 2007/128883 | 11/2007 |
| WO | 2010/052372 A1 | 5/2010 |

OTHER PUBLICATIONS

Japanese Office Action Issued Apr. 23, 2013.

* cited by examiner

SEALPOT AND METHOD FOR CONTROLLING A SOLIDS FLOW RATE THERETHROUGH

CROSS-REFERENCE TO RELATED APPLICATION

This application claims priority to U.S. Provisional Patent Application Ser. No. 61/165,072, filed on Mar. 31, 2009, and all the benefits accruing therefrom under 35 U.S.C. §119, the content of which in its entirety is/are herein incorporated by reference.

STATEMENT REGARDING FEDERALLY SPONSORED RESEARCH AND DEVELOPMENT

The U.S. Government has rights in this invention pursuant to Contract No. DE-FC26-03NT41866 awarded by the U.S. Department of Energy.

TECHNICAL FIELD

The present disclosure relates generally to a sealpot and a method for controlling a flow rate therethrough. More particularly, the present disclosure relates to a sealpot including a multiple orifice exit design and a method for controlling a flow rate of solids through the sealpot.

BACKGROUND

Fluidized bed combustion (FBC) is a combustion technology used in power plants, primarily to burn solid fuels. FBC power plants are more flexible than conventional power plants in that they can be fired on coal, coal waste or biomass, among other fuels. The term FBC covers a range of fluidized bed processes, including circulating fluidized bed (CFB) boilers, bubbling fluidized bed (BFB) boilers and other variations thereof. In an FBC power plant, fluidized beds suspend solid fuels on upward-blowing jets of air during the combustion process in a combustor, causing a tumbling action which results in turbulent mixing of gas and solids. The tumbling action, much like a bubbling fluid, provides a means for more effective chemical reactions and heat transfer in the combustor.

During the combustion process of fuels which have a sulfur-containing constituent, e.g., coal, sulfur is oxidized to form primarily gaseous $SO_2$. In particular, FBC reduces the amount of sulfur emitted in the form of $SO_2$ by a desulfurization process. A suitable sorbent, such as limestone containing $CaCO_3$, for example, is used to absorb $SO_2$ from flue gas during the combustion process. In order to promote both combustion of the fuel and the capture of sulfur, FBC power plants operate at temperatures lower than conventional combustion plants. Specifically, FBC power plants typically operate in a range between about 850° C. and about 900° C. Since this allows coal to combust at cooler temperatures, $NO_x$ production during combustion is lower than in other coal combustion processes.

To further increase utilization of the fuel and efficiency of sulfur capture, a cyclone separator is typically used to separate solids, e.g., unutilized fuel and/or limestone, entrained in flue gas leaving the combustor. The separated solids are then returned to the combustor via a recirculation means, e.g., a recirculation pipe, to be used again in the combustion process. A sealpot, sometimes referred to as a "j-leg," maintains a seal between the combustor and the cyclone separator to prevent unwanted escape of flue gas from the combustor backward, e.g., in a direction opposite to flow of the separated solids into the combustor, through the recirculation pipe.

Air systems in an FBC power plant are designed to perform many functions. For example, air is used to fluidize the bed solids consisting of fuel, fuel ash and sorbent, and to sufficiently mix the bed solids with air to promote combustion, heat transfer and reduce emissions (e.g., $SO_2$, $CO$, $NO_x$ and $N_2O$). In order to accomplish these functions, the air system is configured to inject air, designated primary air (PA) or secondary air (SA), at various locations and at specific velocities and quantities.

In addition, fluidizing air and transport air are typically supplied to the sealpot to facilitate flow of solids and gas through the sealpot, as shown in FIG. 1. Referring to FIG. 1, a sealpot 10 of the prior art includes a downcomer standpipe 15, a fluidizing/transport bed 20, a fluidizing air source 25, a discharge standpipe 30, a transport air source 35 and a weir 40 separating the fluidizing/transport bed 20 and the discharge standpipe 30. The fluidizing/transport bed 20 includes a fluidizing zone supplied with fluidizing air from the fluidizing air source 25, and a transport zone supplied with transport air from the transport air source 35. The fluidizing air source 25 and the transport air source 35 may be separate components, as shown in FIG. 1, or, alternatively, the fluidizing air source 25 and the transport air source 35 may be combined as a single air source (not shown).

As shown in FIG. 1, in the sealpot 10 of the prior art, solids from the combustion process flow downward from the cyclone separator (not shown) through the downcomer standpipe 15 to the fluidizing/transport bed 20. The solids are fluidized by the fluidizing air from the fluidizing air source 25 and/or the transport air source 35 in the fluidizing zone of the fluidizing/transport bed 20. The fluidized solids are then transported through the transport zone of the fluidizing/transport bed 20 to the discharge standpipe 30 by the fluidizing air from the fluidizing air source 25 and/or the transport air supplied from the transport air source 35, thereby forming an expansion bed in the discharge standpipe 25. More specifically, solids which are transported above the weir 40, e.g., above a weir height $H_{weir}$, form the expansion bed, thereby causing some solids to flow over the weir 40 into the discharge pipe 30. In addition, some gases, primarily fluidizing air from the fluidizing air source 25 and transport air from the transport air source 35, flow to the combustor via the discharge standpipe 30. Thus, the sealpot 10 forms a seal, thereby preventing flue gases in the combustor from flowing backward through the sealpot 10, e.g., upward through the downcomer standpipe 15 back into the cyclone (105 shown in FIG. 4).

In the sealpot 10 of the prior art, it is difficult to control a size of the expansion bed due to the nature of unsteady solid/gas interactions, particularly during transition of operations and resulting changes in gas and solids flow rate to the combustor (not shown) through the discharge standpipe 30. As a result, an excessive amount of solids flow over the weir 40, e.g., the size of the sealpot expansion bed suddenly becomes excessively large, which may disrupt the distribution of the fluidization air at the downstream combustor. In such a case, oscillation of pressure changes may occur in the system.

In addition, a range of flow rates of solids regulation through the sealpot 10 is limited in the sealpot 10 of the prior art, since the size of the expansion bed cannot be precisely regulated to control a number of different flow rates of solids over the weir. Put another way, solids are essentially either flowing over the weir or they are not; there are no precisely defined discrete flow rates and different flow rates are therefore difficult to establish a steady continuous flow, especially during transition of operations, as described above.

Accordingly, it is desired to develop a sealpot and a method for controlling a flow rate of solids through the sealpot, such that the sealpot has benefits including, but not limited to: increased solids flow control range and accuracy of regulation thereof; increased steady state seal maintainability; decreased flue gas escape; decreased solids sudden overflow; and increased turndown ratio of solids flow control using a sealpot.

SUMMARY

According to the aspects illustrated herein, there is provided a sealpot for a combustion power plant. The sealpot includes a downcomer standpipe which receives solids of the combustion power plant, a bed having a first end and a second opposite end, the first end connected to the downcomer standpipe, and a discharge standpipe disposed at the second opposite end of the bed. An orifice plate is disposed between the bed and the discharge standpipe to separate the discharge standpipe from the bed. The orifice plate has a plurality of apertures disposed at a height above the bed and which allow transport of fluidized solids and gas through the orifice plate at a controlled rate.

According to the other aspects illustrated herein, there is provided a method of maintaining a seal between a solids separator of a fluidized bed combustion power plant and a combustor of the fluidized bed combustion power plant. The method includes: connecting a downcomer standpipe to the solids separator of the fluidized bed combustion power plant; connecting a first end of a bed to the downcomer standpipe; disposing a discharge standpipe between a second opposite end of the bed and the combustor of the fluidized bed combustion power plant; and disposing an orifice plate between the bed and the discharge standpipe separating the discharge standpipe from the bed. The orifice plate has a plurality of apertures disposed at a height substantially above the bed, and the plurality of apertures allow transport of fluidized solids and gas through the orifice plate.

The above described and other features are exemplified by the following figures and detailed description.

BRIEF DESCRIPTION OF THE DRAWINGS

Referring now to the figures, wherein the like elements are numbered alike.

DETAILED DESCRIPTION

Disclosed herein are a sealpot and a method for controlling a flow rate therethrough, and more specifically, a sealpot having an orifice plate and a method for controlling a flow rate of solids through the sealpot.

Figure 1:
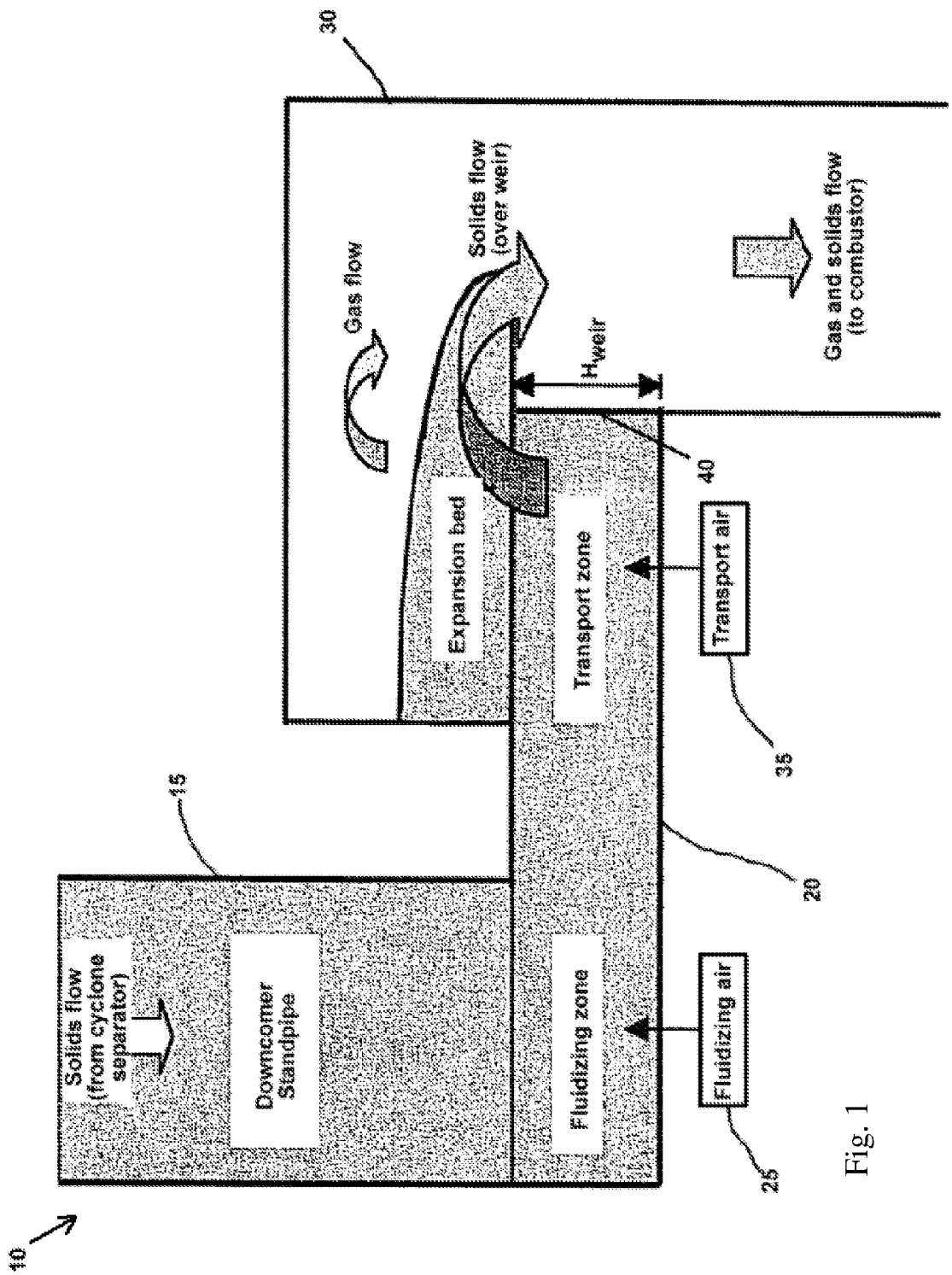
FIG. 1 is a schematic side elevation view of a sealpot of the prior art.
Figure 2:
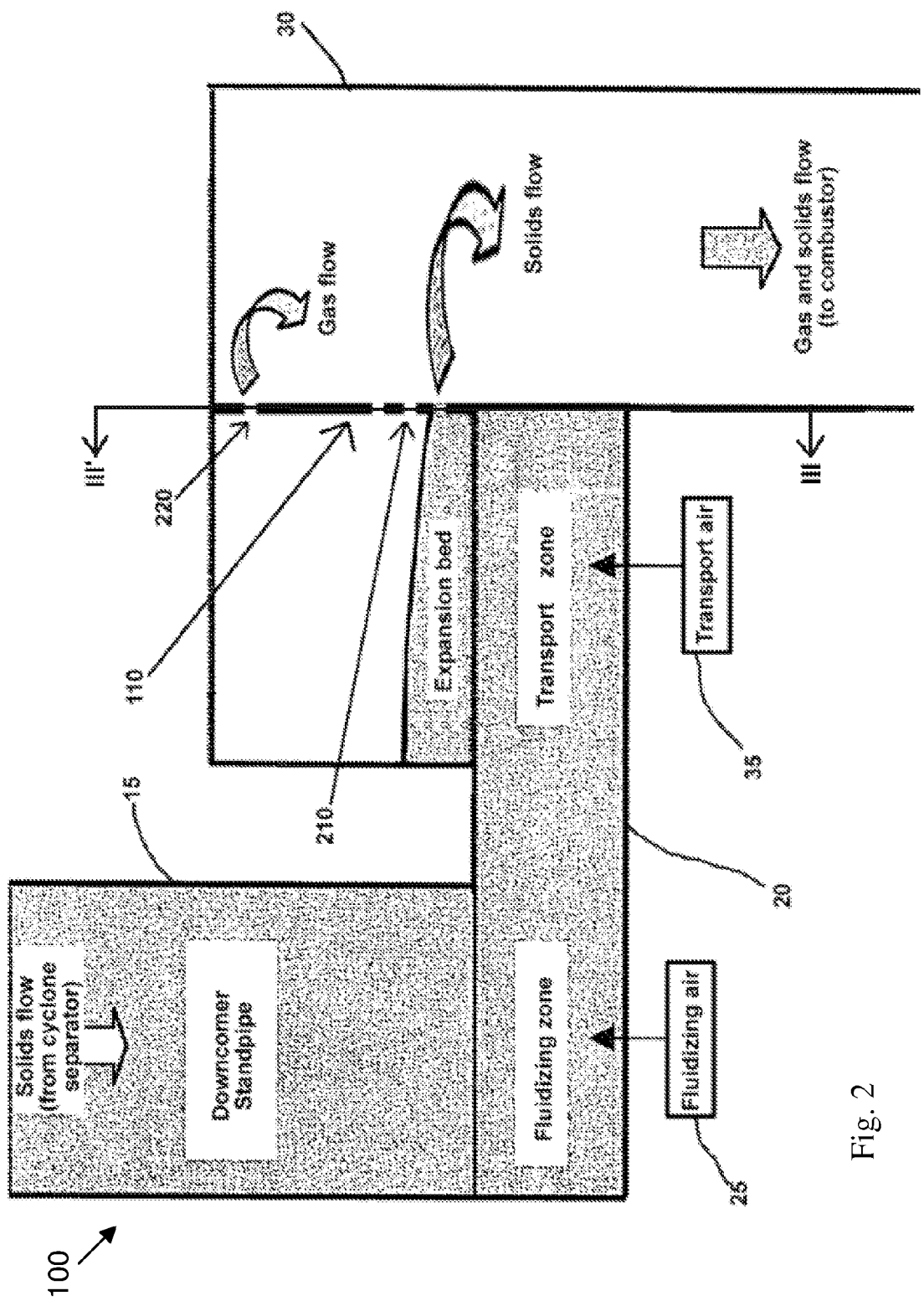
FIG. 2 is a schematic side elevation view of a sealpot according to an exemplary embodiment of the present invention.

Referring to FIG. 2, a sealpot 100 according to an exemplary embodiment of the present invention includes a downcomer standpipe 15. The downcomer standpipe 15 receives solids from a solids separator (not shown) such as a cyclone separator 105 (in FIG. 4), for example, but is not limited thereto in alternative exemplary embodiments. The downcomer standpipe 15 supplies the solids to a fluidizing and/or transport bed 20 of the sealpot 100. A fluidizing zone of the fluidizing/transport bed 20 is supplied with a fluidizing gas, such as fluidizing air, for example, from a fluidizing air source 25. Alternatively (or additionally), a transport zone of the fluidizing/transport bed 20 is supplied with a transport gas, e.g., transport air, supplied from a transport air source 35. The fluidizing air source 25 and the transport air source 35 may be separate components, as shown in FIG. 2, or, alternatively, may be included in a single air source (not shown).

A discharge standpipe 30 of the sealpot 100 is connected to the fluidizing/transport bed 20 in an area substantially corresponding to the transport zone of the fluidizing/transport bed 20. In addition, an orifice plate 110 is disposed between the discharge standpipe 30 and the fluidizing/transport bed 20, as shown in FIG. 2. The orifice plate 110 has a plurality of apertures which limits solids and allows fluids being transported from the fluidizing/transport bed 20 to the discharge standpipe 30.

Figure 3:
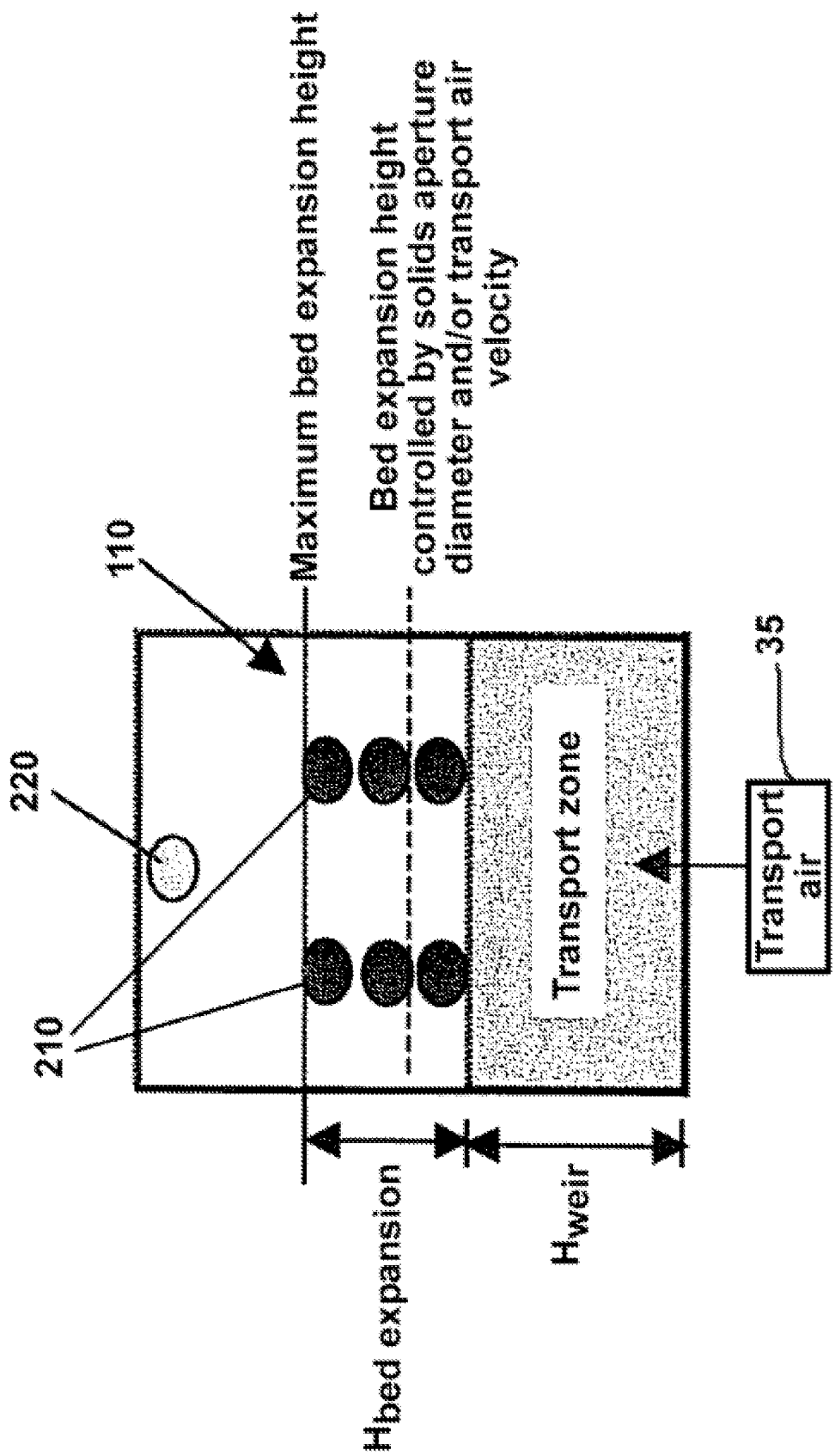
FIG. 3 is a schematic cross-section view, taken along line III-III' of FIG. 2, illustrating an orifice plate of the sealpot according to the exemplary embodiment of the present invention shown in FIG. 2.
Figure 4:
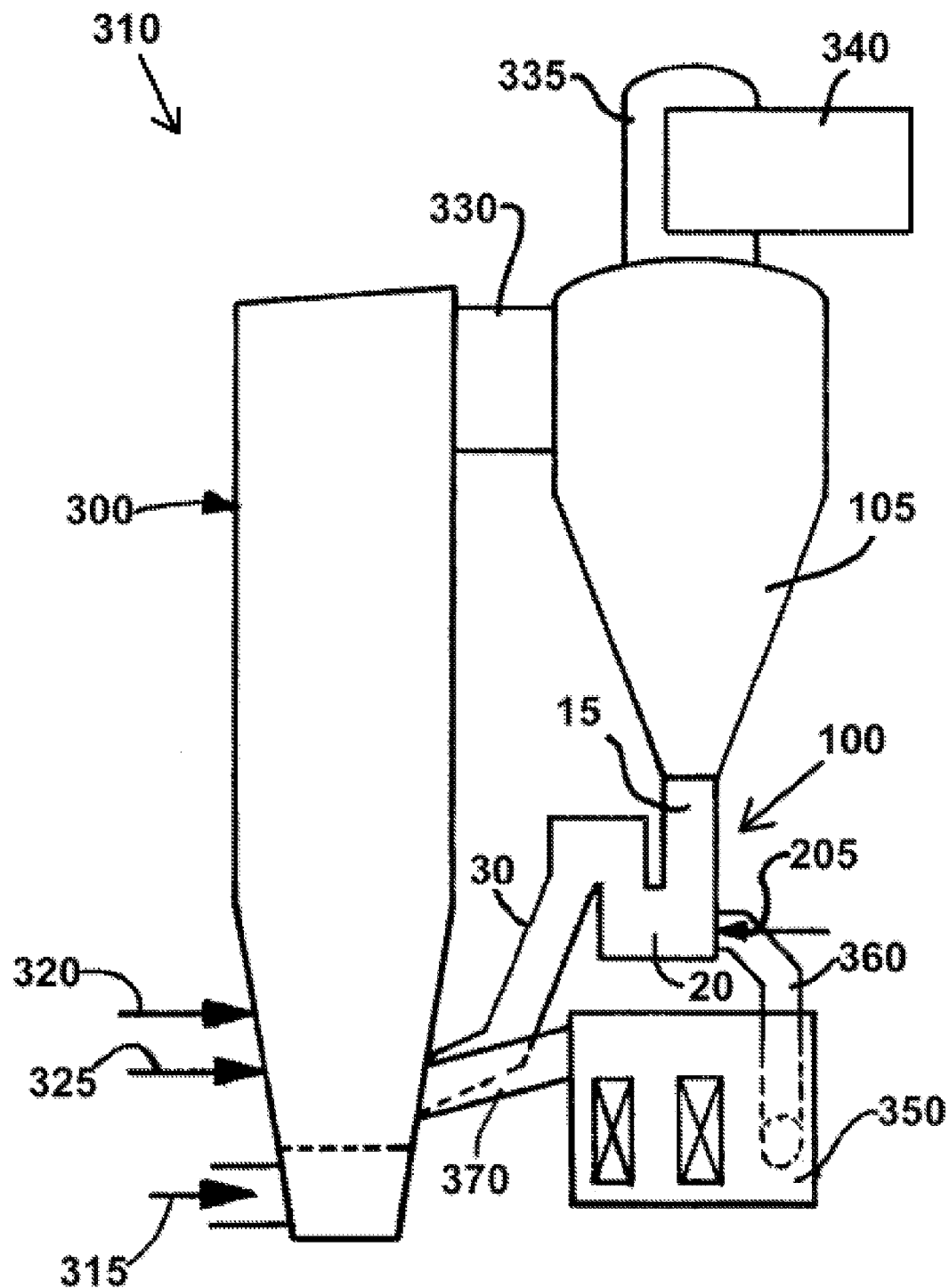
FIG. 4 is a schematic side elevation view of a fluidized bed combustion power plant utilizing the sealpot of FIG. 2 according to an exemplary embodiment of the present invention.

The plurality of apertures of the orifice plate 110 is disposed at a height above the fluidizing/transport bed 20, as shown in FIGS. 2 and 3. The plurality of apertures includes at least one solids aperture 210 and at least one gas aperture 220. In an exemplary embodiment, the solids aperture 210 is located at a height below the gas aperture 220. Specifically, the solids aperture 210 is disposed below the gas aperture 220 with respect to a portion of the discharge standpipe 30 through which gas and solids flow to a combustor 300 (FIG. 4). More specifically, the solids aperture 210 is disposed at a height above a weir height $H_{weir}$ and below a maximum bed expansion height, while the gas aperture 220 is disposed above the maximum bed expansion height (FIG. 3). As a result, fluidized solids maintained in the fluidizing/transport bed 20 act as a seal between the solids separator 105 and the combustor 300.

Referring to FIG. 3, an exemplary embodiment includes a plurality of aperture rows. The plurality of aperture rows includes a first aperture row having at least one solids aperture 210 disposed above the weir height $H_{weir}$ and below the maximum bed expansion height, a second aperture row having at least one solids aperture 210 disposed above the first aperture row and below the maximum bed expansion height, a third aperture row having at least one solids aperture 210 disposed above the second aperture row and below the maximum bed expansion height, and a fourth aperture row having at least one gas aperture 220 disposed above the maximum bed expansion height. It will be noted that additional exemplary embodiments are not limited to configuration described above, that there may be more or less than four aperture rows in an alternative exemplary embodiment. Specifically, for example, another exemplary embodiment may include first and second aperture rows having solids apertures 210 disposed therein, and a third aperture row having gas apertures 220 disposed therein. Accordingly, total solids flow through the sealpot 100 according to an exemplary embodiment is equal to the maximum allowable flow through the particular sealpot 100.

Operation of the sealpot 100 according to an exemplary embodiment will now be described in further detail with reference to FIGS. 2 and 3. The downcomer standpipe 15 receives solids, e.g., particulates from a combustion process, from the cyclone separator 105 (FIG. 4). The solids flow downward in the downcomer standpipe 15, e.g., toward the fluidizing/transport bed 20. When the solids reach the fluidizing/transport bed 20, they mix with fluidizing air supplied from the fluidizing air source 25 and/or with transport air from the transport air source 35 to form fluidized solids in the fluidizing zone of the fluidizing/transport bed 20 (FIG. 2).

As a result, the fluidized solids, along with air from the fluidizing air source 25 and/or the transport air source 35, form an expansion bed. The expansion bed is forced upward out of the fluidizing/transport bed 20 into the discharge standpipe 30, as shown in FIG. 2. Referring to FIG. 3, the expansion bed expands upward into a portion of the discharge standpipe 30 towards the solids apertures 210 of the orifice plate 110. More specifically, when an expansion bed height $H_{bed\ expansion}$ of the expansion bed exceeds the weir height $H_{weir}$, the expansion bed comes into contact with the orifice plate 110. As the expansion bed height $H_{bed\ expansion}$ further increases, the expansion bed is exposed to the solids apertures 210, and solids thereby flow through the solids apertures 210 and downward to the combustor 300 (FIG. 4) through the exposed solids aperture(s) 210. As solids flow exceed the limit of each row of solids apertures 210, the solids will expand upward further until it reaches the next highest row of solids apertures 210. Solids flow is thereby regulated based on the number and arrangement of row of solids apertures 210 in addition to the fluidizing/transport gas supplied.

Gas in the expansion bed, e.g., the air supplied from the fluidizing air source 25 and/or the transport air source 35, also flows upward into the discharge standpipe 30 as the solids flow through the solids apertures 210 of the orifice plate 110. The upward flowing gas then flows through the gas aperture 220 towards the combustor 300.

Thus, both the gas flowing through the gas aperture 220 and the solids flowing through the solids apertures 210 flow downward, e.g., towards the combustor 300 (FIG. 4) and are thereby delivered back to the combustor 300.

In an exemplary embodiment, a flow rate of solids through the sealpot 100 is based upon a velocity of the fluidizing air and/or the transport air supplied from the fluidizing air source 25 and/or the transport air source 35, respectively. In general, the flow of solids is related to the velocity of the fluidizing air and/or the transport air, e.g., increasing the velocity of the fluidizing air and/or the transport air causes a corresponding increase in the flow rate of solids through the sealpot 100 (via more exposed solids apertures 210, as discussed in greater detail above). Therefore, a desired flow rate of solids, based upon operation of a power plant (not shown) having the sealpot 100, is maintained by adjusting the velocity of the fluidizing air and/or the transport air.

In an alternative exemplary embodiment, the flow rate of solids through the sealpot 100 is based upon a total number of solids apertures 210 in contact with, e.g., exposed to, the solids such that the solids can flow through the solids apertures 210. More specifically, the flow rate of solids is substantially proportional to the total number solid apertures 210 exposed to the solids; increasing the total number of solids apertures 210 exposed to the solids increases the flow rate of solids through the sealpot 100. Therefore, the desired flow rate of solids, based upon operation of a power plant (not shown) having the sealpot, is maintained by adjusting the bed expansion height through the total number of solids apertures 210.

In yet another alternative exemplary embodiment, the flow rate of solids through the sealpot 100 is based upon an opening diameter of at least one of the solids apertures 210. Specifically, the flow rate of solids is substantially proportional to the diameter of a given solid apertures 210. More specifically, increasing the diameter of the solids aperture 210, and thereby increasing a cross-sectional area of the solids aperture 210 through which solids can flow, increases the flow rate of solids through the sealpot 100. Therefore, the desired flow rate and flow range of solids, based upon operation of a power plant (not shown) having the sealpot 100, is maintained by adapting the diameter of the solids aperture 210. Further, alternative exemplary embodiments may include individual solids apertures 210 having different diameters, e.g., diameters of each solids aperture 210 need not be equal. In addition, a cross-sectional shape of the solids aperture 210 according to an exemplary embodiment is substantially oval, as shown in FIG. 3, but alternative exemplary embodiments are not limited thereto, but may instead be varied to adjust the flow rate of solids through the sealpot 100. For example, the cross-sectional shape of the solids aperture 210 according to alternative exemplary embodiments may be, for example, circular, rectangular, square, triangular, polygonal or a combination thereof.

In still another alternative exemplary embodiment, the flow rate of solids through the sealpot 100 is based upon a height of a bed expansion line of relative to heights of the solids apertures 210. More specifically, the flow rate of solids is proportional to the height of the solid apertures 210 above the fluidizing/transport bed 20; increasing the height of the bed expansion using the solids apertures 210 increases the flow rate of solids through the sealpot 100, for example. Therefore, the desired flow rate of solids, based upon operation of a power plant (not shown) having the sealpot, is maintained by adjusting the height of the bed expansion using the solids apertures 210 above the fluidizing/transport bed 20.

Thus, a range of solids flow rates is substantially increased or effectively maximized in the sealpot 100 according to an exemplary embodiment by varying the velocity of the fluidizing air and/or the transport air, the total number of solids apertures 210, a diameter of each of the solids apertures 210 and/or a height of each of the solids apertures 210. In addition, varying the attributes of the sealpot 100 described above further provides an advantage of precise control over the improved range of solids flow rates. It should be noted that alternative exemplary embodiments are not limited to the aforementioned methods of controlling the solids flow rate; rather, alternative exemplary embodiments may employ any of, all of, or any combination of the methods described herein, but are not limited thereto. Moreover, it will be noted that the present invention is not limited to power combustion, but may instead be utilized with any solids distribution/transport/other sealpot applications.

In an exemplary embodiment with respect to FIG. 4, a solids control valve 205 (FIG. 4) may be connected to the fluidizing/transport bed 20 at an area of the fluidizing/transport bed 20 substantially opposite to the area substantially corresponding to the transport zone of the fluidizing/transport bed 20.

The solids control valve 205 (FIG. 4) causes a predetermined portion of the fluidized solids in the fluidizing zone of the fluidizing/transport bed 20 to bypass the discharge standpipe 30. For example, a portion of the fluidized solids may be returned to the combustor 300 before reaching the transport zone of the fluidizing/transport bed 20, as will be described in greater detail below with reference to FIG. 4. The solids control valve 205 may, however, be omitted from alternative exemplary embodiments, or may be replaced with other components, such as a pressure seal (not shown) or control valve (not shown), for example, but is not limited thereto.

Referring to FIG. 4, combustion power plant 310 and, more particularly, a fluidized bed combustion (FBC) power plant 310 includes the combustor 300, the solids separator 105, e.g., the cyclone separator 105, and the sealpot 100 according to an exemplary embodiment. The furnace 300 of the FBC power plant is supplied with primary air (PA) 315, secondary air (SA) 320 and fuel 325. In addition, other materials such as limestone (not shown), for example, may be supplied to the furnace 300, but alternative exemplary embodiments are not limited to the foregoing components or materials.

In an exemplary embodiment, the combustor 300 is an FBC-type combustor such as a circulating fluidized bed (CFB) combustor, but alternative exemplary embodiments are not limited thereto. For example, the combustor 300 may be a bubbling fluidized bed (BFB) combustor, a moving fluidized bed combustor or a chemical looping combustor.

As the combustor 300 burns the fuel 325, combustion products, including gases and solids, exit the combustor 300 via a flue 330 and enter the cyclone separator 105. The cyclone separator 105 separates the solids and supplies the solids to the downcomer standpipe 15 of the sealpot 100. The gases exit the cyclone separator 105 via a central duct 335 and are delivered to other components of the FBC power plant 310 such as atmosphere control equipment (not shown) via a tangential duct 340.

The solids separated by the cyclone separator 105 are delivered to the downcomer standpipe 15 of the sealpot 100. In an exemplary embodiment, the solids are then returned to the combustor 300 via the discharge standpipe 30 of the sealpot 100, as described above in greater detail with reference to FIGS. 2 and 3.

In an alternative exemplary embodiment, the solids control valve 205 redirects a predetermined portion of fluidized solids in the fluidizing zone of the fluidizing/transport bed 20 of the sealpot 100 are directed to a fluidized bed heat exchanger 350 through a fluidized bed heat exchanger inlet pipe 360. The redirected fluidized solids pass through the fluidized bed heat exchanger 350 and are then supplied to the combustor 300 through a fluidized bed heat exchanger outlet pipe 370, as shown in FIG. 4. The solids control valve 205, the fluidized bed heat exchanger inlet pipe 360, the fluidized bed heat exchanger 350 and the fluidized bed heat exchanger outlet pipe 370 may be omitted in alternative exemplary embodiments.

Furthermore, alternative exemplary embodiments are not limited to those described herein. For example, a method of maintaining a seal between the solids separator 105 and the combustor 300 of the FBC power plant 310 of FIG. 4 according to an alternative exemplary embodiment includes connecting the downcomer standpipe 15 of the sealpot 100 to the solids separator 105, connecting the fluidizing/transport bed 20 of the sealpot 100 to the downcomer standpipe 15, and connecting the discharge standpipe 30 having the orifice plate 110 therein between the fluidizing/transport bed 20 and the combustor 300.

The method further includes receiving solids from the solids separator 105 into the downcomer standpipe 15, fluidizing the solids using air supplied from the fluidizing air source 25 (FIG. 2), and/or transporting the fluidized solids to the discharge standpipe 30 using air supplied from the transport air source 35 (FIG. 2), receiving the fluidized solids from the fluidizing/transport bed 20 into the discharge standpipe 30, receiving the air supplied from the fluidizing air source 25 and the air supplied from the transport air source 35 into the discharge standpipe 30, and delivering the fluidized solids, the air supplied from the fluidizing air source 25 and the air supplied from the transport air source 35 to the combustor 300 through the discharge standpipe 30 through the plurality of apertures of the orifice plate 110. The present invention contemplates that the flow rate of the fluidized solids transported to the discharge standpipe 30 is controlled based upon at least one of a diameter (e.g., cross-sectional area) of the solids apertures 210, a shape of the solids apertures 210, a total number of the solids apertures 210, a height of the solids apertures 210 and/or a flow rate of the air supplied from the transport air source 35.

Thus, a sealpot according to an exemplary embodiment provides a multiple orifice exit design and a method for controlling a flow rate of solids through the sealpot. Therefore, the sealpot has a substantially increased or effectively improved solids flow control range, as well as increased precision of regulation of the solids flow control range.

In addition, the sealpot has increased steady state seal maintainability, decreased flue gas escape, decreased solids overflow and increased turndown ratio.

It will be noted that while exemplary embodiments have been described with reference to a sealpot associated with fluidized bed combustion power plants such as circulating fluidized bed boilers and chemical looping reactors, alternative exemplary embodiments are not limited thereto. Rather, a sealpot according to alternative exemplary embodiments may be utilized in any type of power plant including, but not limited to, bubbling fluidized bed boilers and other variations of fluidized bed combustion power plants, as well as conventional power plants.

In addition, it will be noted that, while a single sealpot has been described herein, the present invention contemplates that a plurality of the sealpots may be included, such that the plurality of sealpots receive solids flow from a common downcomer standpipe and distribute fluidized solids and gas to various components and/or locations via a number of discharge standpipes corresponding to each of the sealpots. Thus, flow rates and other parameters for each of the associated fluidized solids/gas flow may be controlled based on the individual characteristics, discussed in greater detail above, of each particular sealpot. While the sealpot has been described to control the process of a power plant, the present invention contemplates that the sealpot may be used with any process needing to control solids flow and/or pressure within such a system.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sealpot for a combustion power plant, the sealpot comprising:
   a downcomer standpipe having an upper end, which receives solids of the combustion power plant, and lower end;
   a bed having a first end and a second opposite end, the first end of the bed receiving particles fluidly connected to the lower end of the downcomer standpipe to provide the solids to the bed;
   a discharge standpipe fluidly connected to the second opposite end of the bed;

and an orifice plate disposed at the second opposite end of the bed and disposed between the bed and the discharge standpipe, separating the discharge standpipe from the bed, the orifice plate having a plurality of apertures disposed at a height above the bed, the plurality of apertures allowing transport of fluidized solids and gas through the plurality of apertures of the orifice plate from the bed to the discharge standpipe.

2. The sealpot according to claim 1, wherein
the downcomer standpipe receives the solids from a solids separator,
the bed receives the solids from the downcomer standpipe at the first end of the bed, fluidizes the solids using a gas, and transports the fluidized solids and the gas to the second end of the bed through the apertures of the orifice plate to the discharge standpipe, and
the discharge standpipe receives the fluidized solids and the gas from the bed through the plurality of apertures of the orifice plate and delivers the fluidized solids and the gas to the combustion power plant.

3. The sealpot according to claim 1, wherein the combustion power plant comprises at least one of a fluidized bed combustion power plant, a circulating fluidized bed boiler, a bubbling fluidized bed boiler, a moving fluidized bed boiler and a chemical looping combustor.

4. The sealpot according to claim 1, wherein the plurality of apertures comprises a solids aperture and a gas aperture disposed at a height above the solids aperture.

5. The sealpot according to claim 4, wherein the solids aperture is disposed at a height above a weir height and below a maximum bed expansion height.

6. The sealpot according to claim 5, wherein the gas aperture is disposed at a height above the maximum bed expansion height.

7. The sealpot according to claim 1, wherein the orifice plate extends from a bottom portion defining the bed and extends to a height substantially above the bed.

8. The sealpot according to claim 1, wherein
the gas which fluidizes the solids in the bed includes air supplied from a fluidizing air source,
the fluidized solids are transported to the discharge standpipe using air supplied from a transport air source, and
a flow rate of the fluidized solids transported to the discharge standpipe is controlled based on at least one of, a total number of the plurality of apertures, a diameter of an aperture of the plurality of apertures, a cross-sectional shape of an aperture of the plurality of apertures, an area of an aperture of the plurality of apertures and a height of an aperture of the plurality of apertures.

9. The sealpot according to claim 8, wherein the flow rate of the fluidized solids is further controlled based on a flow rate of the air supplied from the fluidizing air source.

10. The sealpot according to claim 1, wherein
the gas which fluidizes the solids in the bed includes air supplied from a fluidizing air source,
the fluidized solids are transported to the discharge standpipe using air supplied from a transport air source, and
a range of flow rates of the fluidized solids transported to the discharge standpipe is controlled based on at least one of a total number of the plurality of apertures, a diameter of an aperture of the plurality of apertures, a cross-sectional shape of an aperture of the plurality of apertures, an area of an aperture of the plurality of apertures and a height of an aperture of the plurality of apertures.

11. The sealpot according to claim 1, further comprising a solids control valve fluidly connected to the first end of the bed, wherein the solids control valve controls a flow rate of solids to the combustion power plant bypassing the sealpot.

12. The sealpot according to claim 1, wherein the plurality of apertures comprises:
a first aperture row having at least one solids aperture;
a second aperture row having at least one solids aperture; and
a third aperture row having at least one gas aperture, wherein
the first aperture row is disposed at a height above a weir height and below a maximum bed expansion height,
the second aperture row is disposed at a height above the first aperture row and below the maximum bed expansion height, and
the third aperture row is disposed at a height above the maximum bed expansion height.

13. The sealpot according to claim 1, wherein the bed includes at least one of a fluidizing bed and a transport bed.

14. The sealpot according to claim 1, further comprising a plurality of sealpots to enable the fluidized solids and gas from the downcomer standpipe to be transported to corresponding discharge standpipes of each of the sealpots, wherein each of the sealpots include a orifice plate having a plurality of apertures disposed between each respective bed and discharge standpipe.

15. A method of maintaining a seal between a solids separator of a combustion power plant and a combustor of the combustion power plant, the method comprising:
connecting an upper end of a downcomer standpipe to the solids separator of the combustion power plant;
connecting a first end of a bed to a lower end of the downcomer standpipe;
disposing a discharge standpipe at a second opposite end of the bed; and
disposing an orifice plate at the second opposite end of the bed and disposed between the bed and the discharge standpipe separating the discharge standpipe from the bed, the orifice plate having a plurality of apertures disposed at a height above the bed, the plurality of apertures allowing transport of fluidized solids and gas through the orifice plate.

16. The method of claim 15, further comprising:
receiving solids from the solids separator in the downcomer standpipe;
receiving the solids from the downcomer standpipe in the bed at the first end of the bed;
fluidizing the solids using a gas;
transporting the fluidized solids and the gas through the orifice plate to the discharge standpipe at the second end of the bed;
receiving the fluidized solids and the gas from the bed in the discharge standpipe through apertures of the plurality of apertures; and
delivering the fluidized solids and the gas to the combustor, wherein
a flow rate of the fluidized solids transported to the discharge standpipe is controlled based on at least one of a flow rate of the gas, a total number of the plurality of apertures, a diameter of an aperture of the plurality of apertures, a cross-sectional shape of an aperture of the plurality of apertures, an area of an aperture of the plurality of apertures and a height of an aperture of the plurality of apertures.

17. The method of claim 15, wherein the combustion power plant comprises at least one of a fluidized bed combustion power plant, a circulating fluidized bed boiler, a bubbling fluidized bed boiler, a moving fluidized bed boiler and a chemical looping combustor.

18. The method of claim 15, wherein the plurality of apertures comprises a solids aperture disposed at a height above a weir height and below a maximum bed expansion height.

19. The method of claim 18, wherein the plurality of apertures further comprises a gas aperture is disposed at a height above the maximum bed expansion height.

20. The method of claim 18, wherein the bed includes at least one of a fluidizing bed and a transport bed.

21. A sealpot comprising:
an input pipe having an upper end, which receives solids, and a lower end;
a bed having a first end and a second opposite end, the first end of the bed fluidly connected to the lower end of the input pipe to provide the solids to the bed, wherein the solids are fluidized;
a discharge pipe fluidly connected to the second opposite end of the bed for removing the fluidized solids from the bed; and
an orifice plate disposed plate at the second opposite end of the bed and disposed between the bed and the discharge pipe separating the discharge pipe from the bed, the orifice plate having a plurality of apertures disposed at a height above the bed, the plurality of apertures allowing transport of the fluidized solids and gas through the orifice plate from the bed to the discharge standpipe.

22. The sealpot according to claim 21, wherein the plurality of apertures comprises a solids aperture and a gas aperture disposed at a height above the solids aperture.

23. The sealpot according to claim 22, wherein the solids aperture is disposed at a height above a weir height and below a maximum bed expansion height.

24. The sealpot according to claim 23, wherein the gas aperture is disposed at a height above the maximum bed expansion height.

25. The sealpot according to claim 21, wherein
the gas which fluidizes the solids in the bed includes air supplied from a fluidizing air source,
the fluidized solids are transported to the discharge pipe using air supplied from a transport air source, and
a flow rate of the fluidized solids transported to the discharge pipe is controlled based on at least one of a total number of the plurality of apertures, a diameter of an aperture of the plurality of apertures, a cross-sectional shape of an aperture of the plurality of apertures, an area of an aperture of the plurality of apertures and a height of an aperture of the plurality of apertures.

26. The sealpot according to claim 21, wherein
the gas which fluidizes the solids in the bed includes air supplied from a fluidizing air source,
the fluidized solids are transported to the discharge pipe using air supplied from a transport air source, and
a range of flow rates of the fluidized solids transported to the discharge pipe is controlled based on at least one of a total number of the plurality of apertures, a diameter of an aperture of the plurality of apertures, a cross-sectional shape of an aperture of the plurality of apertures, an area of an aperture of the plurality of apertures and a height of an aperture of the plurality of apertures.

27. The sealpot according to claim 21, wherein the plurality of apertures comprises:
a first aperture row having at least one solids aperture;
a second aperture row having at least one solids aperture; and
a third aperture row having at least one gas aperture, wherein
the first aperture row is disposed at a height above a weir height and below a maximum bed expansion height,
the second aperture row is disposed at a height above the first aperture row and below the maximum bed expansion height, and
the third aperture row is disposed at a height above the maximum bed expansion height.

* * * * *